(12) United States Patent
Struk et al.

(10) Patent No.: US 8,171,206 B2
(45) Date of Patent: May 1, 2012

(54) AVOIDANCE OF SELF EVICTION CAUSED BY DYNAMIC MEMORY ALLOCATION IN A FLASH MEMORY STORAGE DEVICE

(75) Inventors: Vadzim Struk, Minsk (BY); Derrill Sturgeon, Cupertino, CA (US)

(73) Assignee: Sandisk Technologies Inc., Plano, TX (US)

( * ) Notice: Subject to any disclaimer, the term of this patent is extended or adjusted under 35 U.S.C. 154(b) by 880 days.

(21) Appl. No.: 12/177,863

(22) Filed: Jul. 22, 2008

(65) Prior Publication Data

US 2010/0023673 A1 Jan. 28, 2010

(51) Int. Cl.
G06F 12/00 (2006.01)
(52) U.S. Cl. .............................. 711/103; 711/E12.001
(58) Field of Classification Search .................. 711/103
See application file for complete search history.

(56) References Cited

U.S. PATENT DOCUMENTS

| 4,466,056 | A | * | 8/1984 | Tanahashi ..................... 711/206 |
| 5,175,830 | A | * | 12/1992 | Sherman et al. .................. 711/2 |
| 5,588,129 | A | | 12/1996 | Ballard ......................... 395/440 |
| 7,062,761 | B2 | | 6/2006 | Slavin et al. |
| 7,127,559 | B2 | | 10/2006 | Hu et al. |
| 2006/0143388 | A1 | | 6/2006 | Wintergerst et al. .......... 711/130 |
| 2006/0190924 | A1 | | 8/2006 | Bruening et al. |
| 2007/0061597 | A1 | | 3/2007 | Holtzman et al. |
| 2007/0106853 | A1 | | 5/2007 | Evanchik et al. |
| 2009/0210615 | A1 | | 8/2009 | Struk et al. |

FOREIGN PATENT DOCUMENTS

| EP | 0403124 A | 12/1990 |
| WO | WO 2010/011780 | 1/2010 |

OTHER PUBLICATIONS

International Search Report and Written Opinion mailed Sep. 16, 2009 in Application No. PCT/US2009/051445.
"Computer Systems Organization II (Virtual Memory)," Google, http://cs.nyu.edu/courses/spring03/V22.0202-001/lectures/lect15.pdf/downloaded Feb. 12, 2008, 6 pages, Apr. 7, 2003.
ARC™ International "MetaWare™ Development Toolkit—Automated Overlay Management Specification Rev 1.5," 2006 ARC International, 39 pages.
Office Action dated Sep. 10, 2010 for U.S. Appl. No. 12/031,384.
U.S. Notice of Allowance for U.S. Appl. No. 12/031,384 mailed Feb. 8, 2011.

* cited by examiner

*Primary Examiner* — Reginald Bragdon
*Assistant Examiner* — Larry Mackall
(74) *Attorney, Agent, or Firm* — Weaver Austin Villeneuve & Sampson LLP

(57) ABSTRACT

The operating firmware of a portable flash memory storage device is stored in the relatively large file storage memory, which is non executable. It is logically parsed into overlays to fit into an executable memory. The overlays can be of differing sizes to organize function calls efficiently while minimizing dead space or unnecessarily separating functions that should be within one or a group of frequently accessed overlays. For an overlay having functions that require data allocation, the data allocation can cause eviction. This self eviction is avoided altogether or after initial runtime.

18 Claims, 4 Drawing Sheets

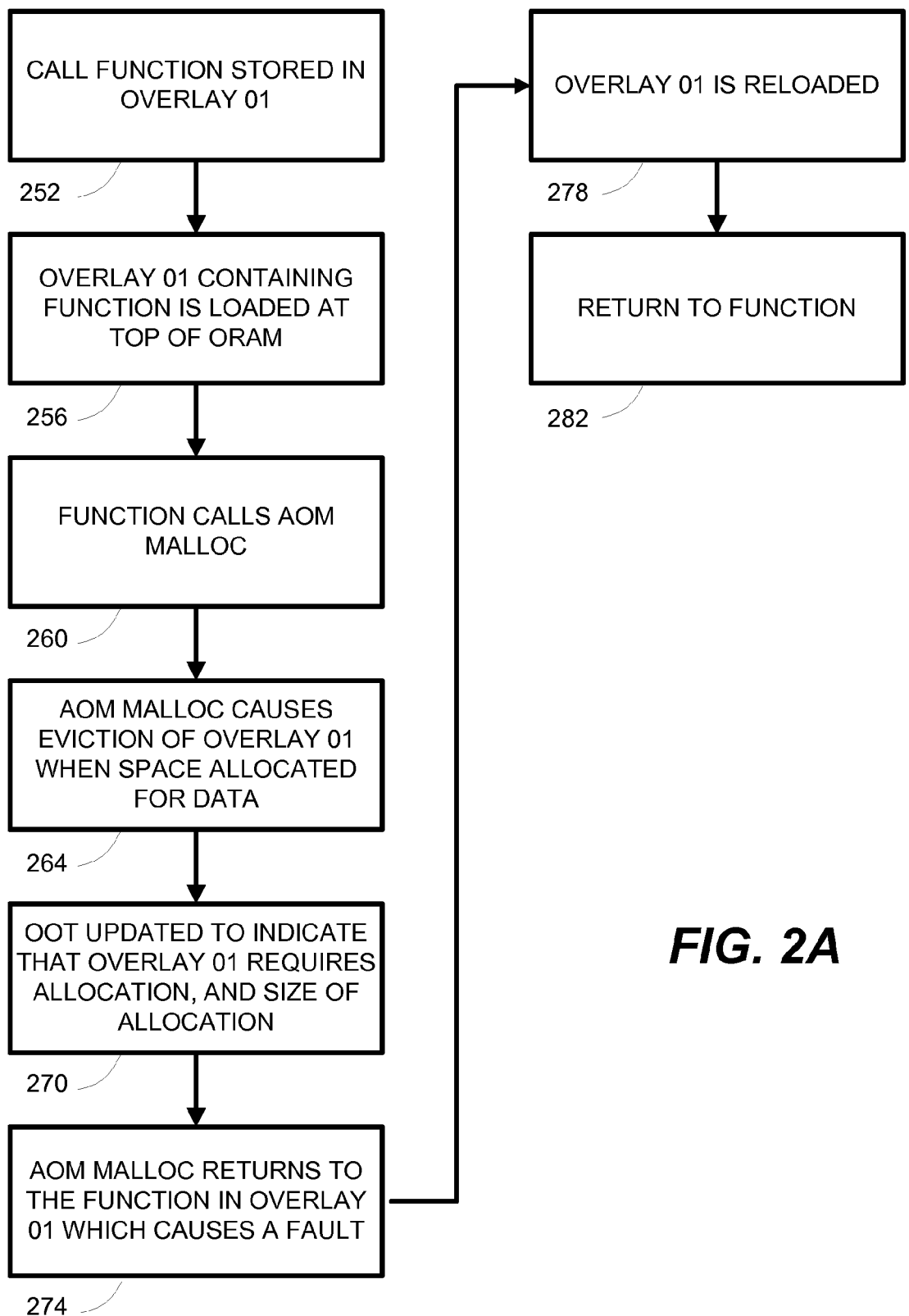

AVOIDANCE OF SELF EVICTION CAUSED BY DYNAMIC MEMORY ALLOCATION IN A FLASH MEMORY STORAGE DEVICE

CROSS REFERENCE TO RELATED APPLICATION

The present application is related to U.S. patent application Ser. No. 12/031,384 entitled "Overlay Management in a Flash Memory Storage Device" filed on Feb. 14, 2008, which is hereby incorporated by reference in the entirety together with all documents referenced in this application.

BACKGROUND OF THE INVENTION

The present application relates to flash memory, and more specifically to management of the firmware of flash memory storage devices.

Flash memory mass storage devices, that is to say, those that are primarily used to store large amounts of user files, often utilize NAND flash memory as a main storage unit, rather than NOR or other execute in place memory. Such storage devices include digital memory cards and USB drives and the like used to store massive libraries of photos and music etc, and are even recently utilized as the primary storage in certain laptop computers. Because of the large amount of storage available in the NAND, it is desirable to use the NAND to store the firmware, even though it is not executable from NAND.

SUMMARY OF THE INVENTION

The operating firmware of a portable flash memory storage device is stored in the relatively large file storage memory, which is non executable. It is logically parsed into overlays to fit into an executable memory. The overlays can be of differing sizes to organize function calls efficiently while minimizing dead space and unnecessary separation of functions that should be within one or a group of frequently accessed overlays. For an overlay having functions that require data allocation, the data allocation can cause eviction. This self eviction is avoided altogether or after initial runtime.

One aspect of the invention relates to a method comprising storing firmware to be executed by a memory controller within a NAND flash memory of a memory system. The method also comprises logically ordering the firmware into overlays, said overlays varying in size; loading a required overlay into RAM memory; and evicting the loaded overlay the first time the overlay is loaded based on a data space requirement within the RAM memory of a function within the overlay, but after the first time the overlay is loaded, reserving space within the RAM for the data space requirement, thereby obviating the need to evict the overlay.

Another aspect of the invention relates to a method in a memory system incorporating NAND flash memory and a memory controller. The method comprises: storing firmware to be executed by the memory controller within the NAND flash memory; logically ordering the firmware into overlays of a size less than a maximum amount of a an overlay RAM memory dedicated to firmware execution, said overlays varying in size; calling a function stored in an overlay; loading the overlay into a dedicated RAM memory of the memory controller; saving an indication that the selected overlay requires allocation of space within the overlay RAM for data; and subsequently utilizing the indication to avoid self eviction of the selected overlay.

Yet another aspect of the invention relates to a method in a memory system incorporating NAND flash memory and a memory controller. The method comprises: storing firmware to be executed by the memory controller within the NAND flash memory; logically ordering the firmware into overlays of a size less than a maximum amount of a an overlay RAM memory dedicated to firmware execution, said overlays varying in size; calling a function stored in an overlay; loading the overlay into a dedicated RAM memory of the memory controller; saving an indication that the selected overlay requires allocation of space within the overlay RAM for data; and subsequently utilizing the indication to avoid self eviction of the selected overlay.

BRIEF DESCRIPTION OF THE DRAWINGS

FIG. 2A is a flowchart illustrating an initial overlay loading process.

DETAILED DESCRIPTION OF THE PREFERRED EMBODIMENTS

Software programs are loaded into an electronic device executable memory and executed. When a software program is larger than the executable memory capacity of the device, then software overlays or virtual memory are used.

Virtual memory is an address space that is mapped to physical memory via an operating system typically employing a memory management unit implemented in hardware. It is common in personal computer and other unconstrained computing devices. In a virtual memory system, large programs are broken up into small segments, called "pages." Pages are loaded from secondary storage, as needed, into a section of machine memory reserved for the program.

In memory cards and other flash memory storage devices virtual memory is not practical and not typically implemented. Therefore, software overlays are utilized. The operating software of a flash memory storage device is typically referred to as the firmware. A firmware overlay is a program segment called into memory when required by an overlay manager. Each overlay called may overwrite an existing overlay in memory. Dynamic allocation of memory for the overlays must be carefully managed.

Figure 1A:
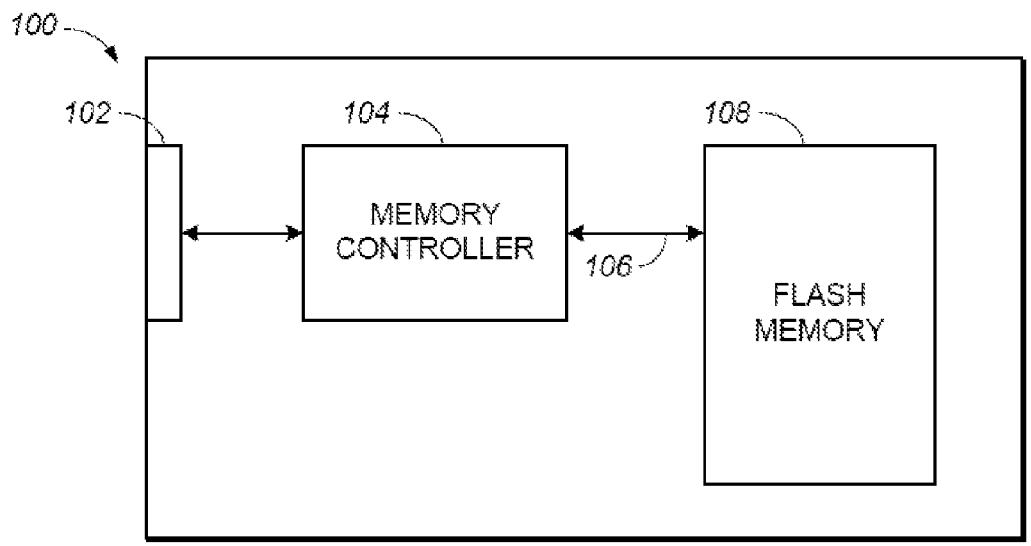
FIG. 1A is a block diagram illustrating flash memory storage device 100.

FIG. 1A illustrates flash memory storage device ("FMSD") 100. FMSD comprises a flash memory array 108, memory controller 104, and host interface 102. Flash memory array 108 is a non-execute in place variety of flash memory, preferably of a NAND architecture and is typically in the form of a EEPROM. Flash memory array 108 is used to store mass quantities of user files and is the main data storage repository of device 100. As such, it is desirable to take advantage of the large capacity and to store the firmware, or operating instructions for FMSD 100 with array 1089. Memory controller 104 itself comprises a processor and an executable random access memory ("RAM") (not shown). FMSD 100 may also comprise one or more RAM memories outside of the memory controller. Host interface 102 may be configured to be the contacts of a memory card such as a Secure Digital or other memory card standard, may be a universal serial bus ("USB") connector or IEEE 1394 "firewire" connector or the like, or in the case FMSD 100 is embedded, may be a device specific interface. Flash memory array 108 is coupled to memory controller 104 via control and data lines 106.

The firmware that runs a memory storage device is broken up into overlays appropriately sized to fit into a RAM to be executed. Countless hours are spent determining what function calls should optimally go into the various overlays, so that the tasks of firmware are efficiently executed, with a minimum of latency resulting from cycling overlays into and out of RAM unnecessarily. For example, if a function in a first overlay calls for another function in a second overlay and vice versa, then the system would spend much time "thrashing" between the two overlays. While this example with two overlays is overly simplistic, the point is that if the overlay management is not properly managed, much time can be spent simply switching between overlays rather than performing the overall functions of the firmware.

In large processor controlled systems such as personal computers, where typically the processing speed is significantly faster than the storage access time of the hard drive or other data storage mechanism, and large amounts of RAM are available, this is much less of a problem. The relatively large amount of available RAM, together with virtual memory management techniques available in PC's and the like are not characteristic of constrained system environments.

Constrained system environments that incorporate NAND memory are especially problematic because the firmware is quite large and complex in order to manage the storage operations of the NAND architecture. NAND memory often has regions that vary in quality from other regions within or between multiple memory die. In order to save costs, systems such as memory cards employ unproven NAND with such variable quality regions. This is in contrast to systems that may employ only tested good NAND, meaning that poorer performance regions are either not utilized or otherwise not present. Such a luxury is not available or practical in larger capacity devices that must be provided at minimal costs. In such devices, the firmware must actively manage the usage of the NAND to constantly monitor the performance of the various regions and modify the read/write parameters and physical/logical mapping of the data so that unreliable areas are mapped out if necessary, and the user files and data will not be compromised or lost. This results in even larger and more complicated firmware (than with tested good NAND), which means that overlay management and RAM usage is therefore critical.

A (firmware) function stored in an overlay may be called at any time. There is no guarantee that the overlay containing the function will be in RAM when the function is called. An automatic overlay manager ("AOM") of the firmware will handle each call in order to manage the "fault" cases where a function is called but is not present in RAM. In the case of a fault, the AOM will load the appropriate overlay prior to locating the function and calling it.

Figure 1C:
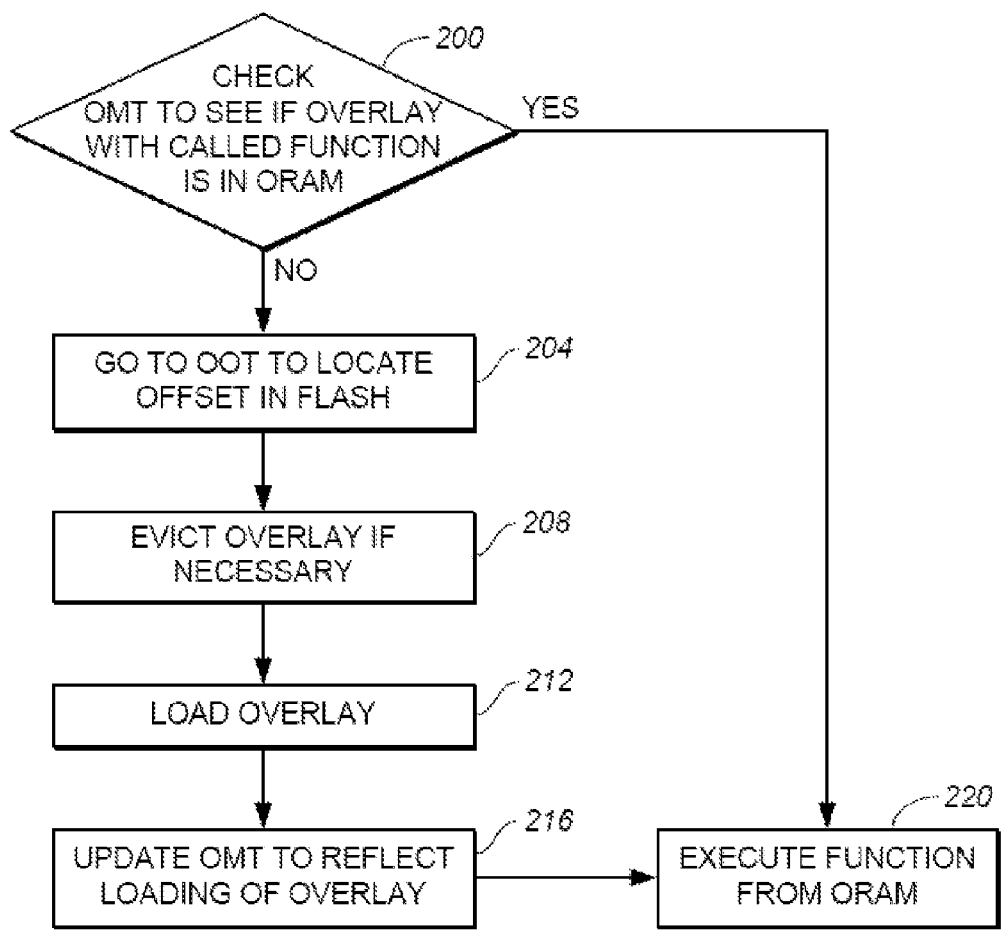
FIG. 1C is a flowchart describing overlay management.
Figure 1B:
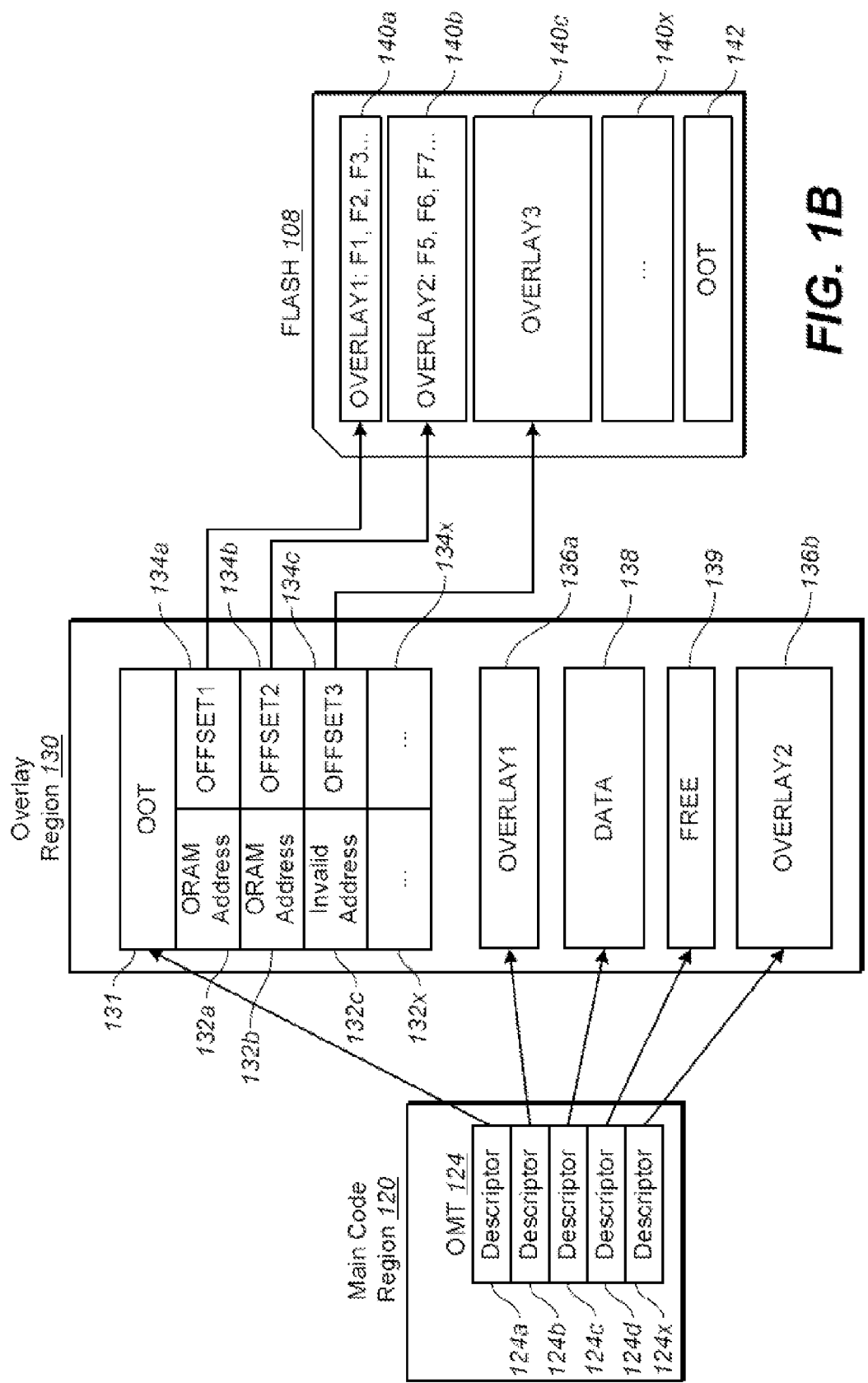
FIG. 1B is a block diagram illustrating a portion of the RAM and flash memory space of FMSD 100.

FIG. 1B illustrates a portion of the RAM and flash memory space of FMSD 100. Main code region 120 of RAM contains an overlay mapping table ("OMT") 124 with descriptors/entries 124a-124x. The OMT is a table that describes the overlays currently loaded in overlay RAM ("ORAM"). Each entry 124a-x of OMT 124 describes a particular area in ORAM 130, also referred to as overlay region 130. The 124 OMT is a map to overlays in RAM and it is constantly changing. It defines how much RAM is allocated to which overlay and what portion(s) of RAM is/are free.

ORAM 130 comprises overlay offset table ("OOT") 131, which in turn comprises ORAM addresses 132a-132x. OOT 131 is a map to overlays in the flash memory. Each ORAM address 132a-x indicates the corresponding offset 134a-134x of the particular overlay within the flash memory. The OOT 131 is a table that describes all overlays 140a-140x located in flash that are candidates to be loaded at some point on demand. The OOT 142 is itself loaded into ORAM together with the overlays. Each of the overlays 136a-x or 140a-x contains at least one function, as represented in overlays 140a and 140b.

As can be seen in FIG. 1B, various overlays 136a-136x (only 136a and 136b shown) are present in the ORAM 130. The number of overlays depends on the size of the individual overlays and the overall ORAM 130. ORAM 130 may be a discrete RAM or a region within a larger RAM allocated to overlays. Data 138, and free space 139 are also present in ORAM 130. Data 138 may be either writeable or constant. Writeable data is an allocation of space and the caller who allocates puts 'something' there . . . it remains locked until the caller frees it. Data cannot be evicted in the same way code (overlays) can. Constant data is a bit different . . . it is again "something" that the call wants to use but it is loaded from flash and it then is preferably treated as read only, although it need not be read only. With regard to constant data the AOM will not write back any modifications that happen to the constant data while it is in RAM.

The AOM is considered "automatic" because the loading of overlays is handled without having to explicitly specify when and where to load within the primary flow of logic in the FMSD firmware. The determination of when to load them is left to the AOM. This is to say that the AOM functionality can be integrated into any different number of FDSM products or configurations, and need not be specifically configured to the particular hardware implementation.

For each overlay function, the compiler generates a token reference to an overlay the function belongs to, and an offset of the function in the overlay. For each call of the overlay function, the compiler generates a special set of instructions to call the AOM handler providing the function token in a special register.

Before calling the target function, the AOM ensures that the overlay containing the function is loaded to ORAM. The information about overlay addresses in ORAM is located in the OOT. The index of the overlay in the OOT can be extracted from an overlay token. Each OOT entry contains an overlay ORAM address field. This acts as a short cut and eliminates the need to search the OMT in certain embodiments. If the overlay has not been loaded to ORAM, then the field value equals −1 (invalid address). That means that the overlay should be loaded from flash to ORAM. The AOM does this using another OOT entry field—Offset. Offset indicates the overlay address in flash. Whether the target function was already in ORAM or has been loaded by the AOM, it is safe to call it. The OMT contains information about memory distribution. It comprises the descriptors, and each descriptor includes: start address, size, flags and token (overlay ID). The flags field indicates whether the entry points to free memory or to memory occupied with an overlay or data buffer. For further information, please refer to the *MetaWare™ Development Toolkit—Automated Overlay Management Specification Rev* 1.5 of ARC™ International, available at www.arc.com, which is hereby incorporated by reference in the entirety.

In order to load an overlay, sufficient free space must be available in RAM. In general, space is made available though an eviction process.

Eviction refers to the process of selecting an overlay that is already in RAM and discarding it to make space available for a new overlay to be loaded. How overlays are selected for eviction varies. A least recently loaded ("LRL") approach is disclosed in U.S. patent application Ser. No. 12/031,384 entitled "Overlay Management in a Flash Memory Storage Device" filed on Feb. 14, 2008, which is hereby incorporated by reference in the entirety. Although the LRL approach is generally preferred, any generalized eviction methodology such as a least recently used ("LRU") approach may be utilized, as modified/implemented/supplemented by the following processes to avoid self eviction.

FIG. 1C is a flowchart describing an embodiment of overlay management at a high level. In step 200 the system checks the OMT to see if an overlay with a called function is in ORAM. If it is, the function will be executed from the ORAM as seen in step 220. If however it is not, in step 204 the system will go to the OOT to locate the overlay in flash, as determined by the overlay offset. In step 208, the system will evict one or more overlays if necessary, to make space for another needed overlay or overlays. In step 212, the overlay is loaded, and in step 216, the OMT is updated to reflect the loading of the overlay. With the function and associated overlay in memory the function will be executed from ORAM in step 220.

It is desirable to avoid a situation where a function within an overlay, when called, results in eviction of the overlay that contains the function.

FIG. 2A illustrates a process that includes loading of an overlay for the first time.

In step 252, the system (firmware) calls a function which is stored in an overlay. In step 256, an overlay containing the called function, referred to as overlay 01 in these exemplary figures, is loaded in ORAM in step 256. The first time it is loaded, it is preferably loaded at the top of the ORAM, although it could be loaded anywhere within the ORAM. In step 260, the function allocates memory space for data. In one embodiment, this entails an AOM calling a memory allocation routine ("MALLOC"). Then in step 264, the AOM MALLOC causes eviction of overlay 01 when memory space for the data is allocated. This happens because certain functions require relatively large data allocations that will result in a need to use the ORAM space where the overlay was loaded. In step 270, the OOT is updated to indicate that overlay 01 requires data allocation. The OOT is also preferably updated to indicate the size of the required allocation. In step 274, the (AOM MALLOC of the) system returns to the called function of overlay 01 which causes a fault as the function is no longer resident in the ORAM. In step 278, overlay 01 is reloaded and in step 282 the system returns to executing the called function.

Figure 2B:
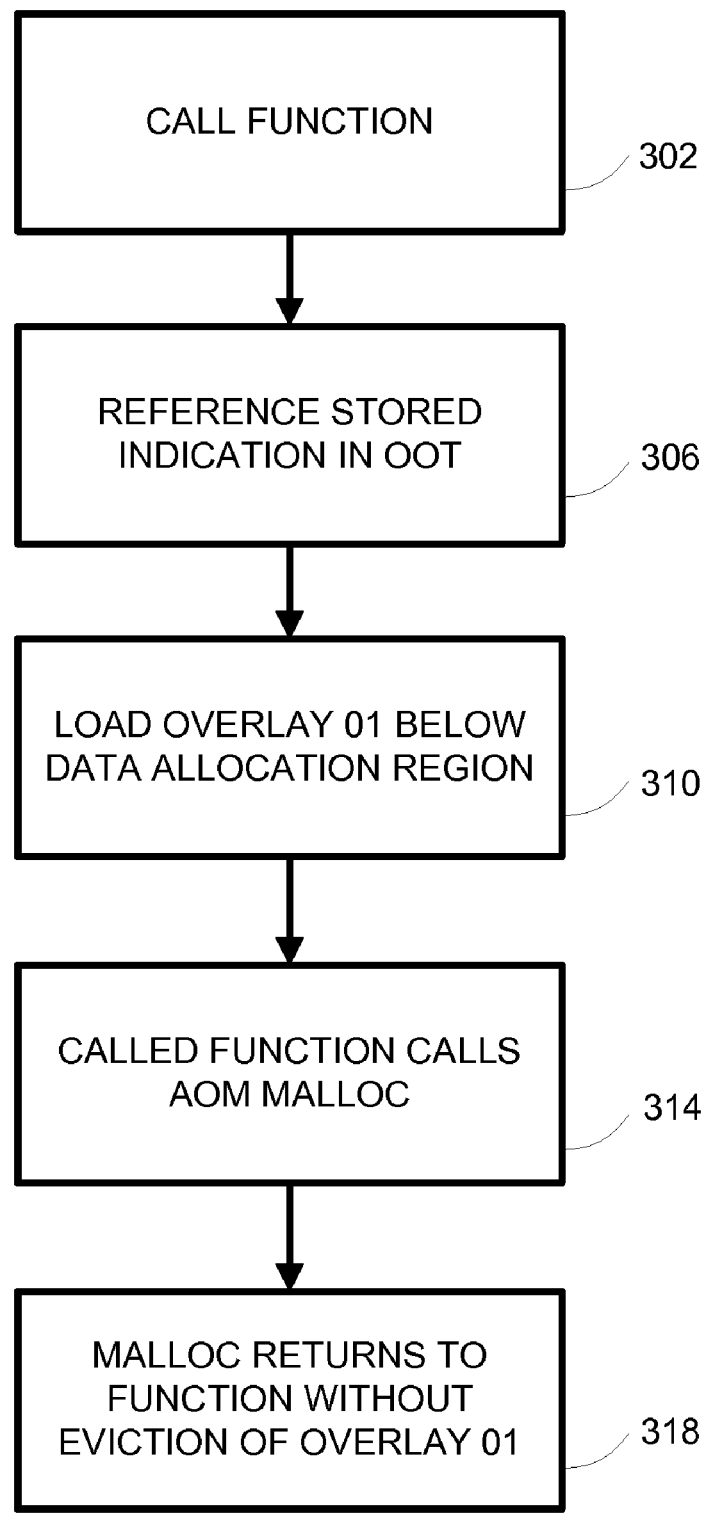
FIG. 2B is a flowchart illustrating a subsequent overlay loading process.

FIG. 2B illustrates a process that includes loading an overlay for a second time and thereafter.

In step 302 a function stored in overlay 01 is called. Then in step 306 the system ensures that overlay 01 is loaded at a location in ORAM below the data allocation region required by one or more functions of overlay 01. In one embodiment it does this by checking the indication(s) previously stored in the OOT in step 270. In embodiments where the size of the data allocation is stored in the OOT, the data allocation will be of the stored size. As different functions within an overlay may require different size data allocations, in a preferred embodiment the stored size of the data allocation the maximum data allocation of any function within the overlay. In another embodiment, the size of the required data allocation for each function within an overlay can be saved in the OOT. In other embodiments where the size of the required data allocation is not stored, the data allocation can be of a maximum anticipated size for all the overlays and functions therein. Then in step 310, the system loads overlay 01 below the data allocation region, and in step 214 the called function calls the AOM MALLOC. Note that while in the preferred embodiment the space for data is reserved at the top of the ORAM and the overlay is loaded below the reserved space, but in other embodiments the space may be reserved at any location within the ORAM and the overlay may be loaded above or below the reserved space. In step 318, the AOM MALLOC returns to the function without eviction of the overlay 01.

Thus, self eviction will only occur the first time an overlay prone to such behavior occurs. The memory system in essence "learns" about the self-evicting tendencies of the overlay at run time and adjusts accordingly. As an alternative, the OOT entries for each overlay are pre-loaded with the indication(s) of whether the functions within the overlay require data allocation and the associated size of the data allocation.

The invention claimed is:

1. In a memory system incorporating NAND flash memory and a memory controller, a method comprising:
   storing firmware to be executed by the memory controller within the NAND flash memory;
   logically ordering the firmware into overlays of a size less than a maximum amount of an overlay RAM memory dedicated to firmware execution, said overlays varying in size;
   calling a function stored in a selected overlay;
   initially loading the selected overlay into a first position of a dedicated RAM memory of the memory controller;
   saving an indication that the selected overlay requires allocation of space within the overlay RAM for data; and
   subsequently utilizing the indication to avoid self eviction of the selected overlay from the overlay RAM by loading the selected overlay into a second position of the dedicated RAM memory differing from the first position each time after the initial loading of the selected overlay.

2. The method of claim 1, wherein the indication is saved at run time.

3. The method of claim 1, wherein the indication is saved in an overlay offset table.

4. The method of claim 1, wherein the indication is saved in the NAND flash memory.

5. The method of claim 1, wherein subsequently utilizing the data allocation requirement indication to avoid self eviction of the selected overlay comprises, at each instance the selected overlay is called after the initial loading of the selected overlay, referencing the saved data allocation requirement indication.

6. The method of claim 5, wherein subsequently utilizing the indication to avoid self eviction of the selected overlay further comprises reserving a region of the overlay RAM sufficient for the data allocation, and loading the selected overlay below the reserved region.

7. The method of claim 6, wherein the reserved region is at a un upper boundary of the overlay RAM.

8. The method of claim 6, wherein the region reserved for data allocation is equal to or greater than the largest required data allocation for any function of the firmware.

9. The method of claim 6, wherein a size indication is saved in an overlay offset table.

10. The method of claim 1, further comprising saving an indication of a size of the allocation of the space required within the overlay RAM.

11. The method of claim 10, wherein subsequently utilizing the data allocation requirement indication to avoid self eviction of the selected overlay comprises, at each instance the selected overlay is called after the initial loading of the selected overlay, referencing the saved data allocation requirement indication, and the indication of the size of the required allocation.

12. The method of claim 1, wherein a size indication is saved in the NAND flash memory.

13. In a memory system incorporating NAND flash memory and a memory controller, a method comprising:
storing firmware to be executed by the memory controller within the NAND flash memory;
logically ordering the firmware into overlays, said overlays varying in size;
calling a function stored in an overlay;
loading the overlay into a RAM memory of the memory controller a first time, said overlay loaded at an upper boundary of the overlay memory the first time it is loaded;
determining if the overlay calls a function requiring memory allocation in the RAM memory of the controller;
saving information regarding the required memory allocation;
referencing the saved information and if said saved information indicates that memory allocation is required, loading the overlay in an area other than at the upper boundary of the memory each time after the first time.

14. The method of claim 13, wherein the saved information comprises an indication of a positive or negative need for memory allocation.

15. The method of claim 13, wherein determining if the overlay calls a function requiring memory allocation in the RAM memory of the controller, comprises determining whether allocation is required for data to be written.

16. The method of claim 13, wherein the saved information comprises an indication of a size of the memory allocation.

17. The method of claim 13, wherein loading the overlay in an area other than at the upper boundary of the memory each time after the first time, comprises loading the overlay below an area reserved for data to be written by the loaded overlay.

18. In a memory system incorporating NAND flash memory and a memory controller, a method comprising:
storing firmware to be executed by the memory controller within the NAND flash memory;
logically ordering the firmware into overlays, said overlays varying in size;
loading a required overlay into RAM memory; and
evicting the loaded overlay the first time the overlay is loaded based on a data space requirement within the RAM memory of a function within the overlay,
but after the first time the overlay is loaded, reserving space within the RAM for the data space requirement, thereby obviating the need to evict the overlay.

* * * * *